A. J. BELL.
BUTTER PACKAGE.
No. 171,975. Patented Jan. 11, 1876.
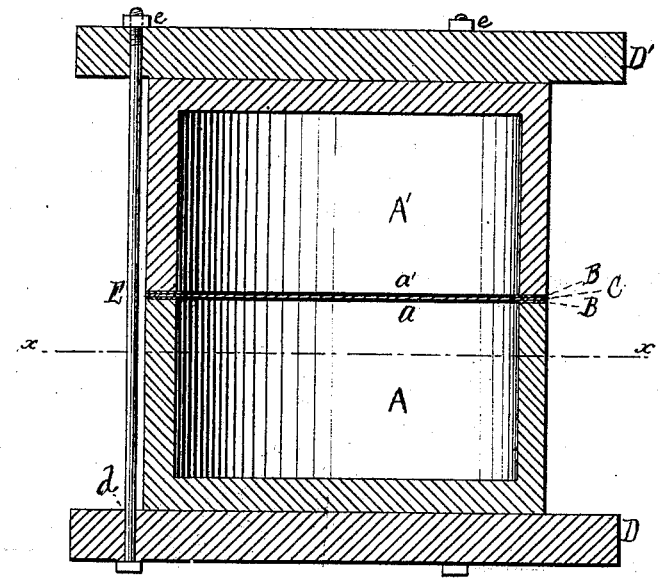
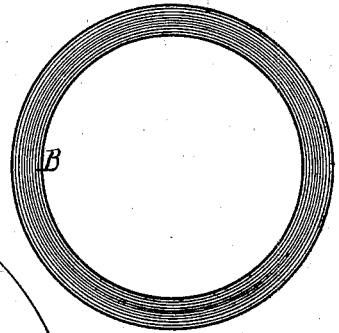
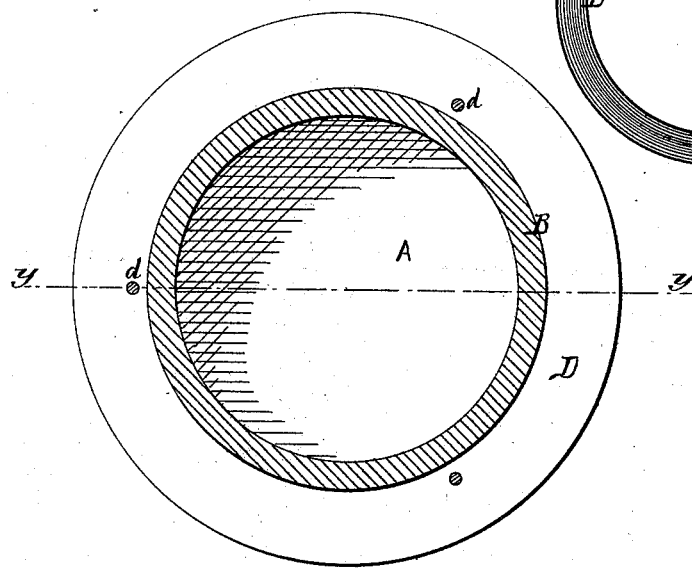
Witnesses:
Edwin James.
John K. Jones.
Inventor:
A. John Bell.
per J. E. J. Holmead
Attorney.

UNITED STATES PATENT OFFICE.

A. JOHN BELL, OF ASHLAND, KENTUCKY.

IMPROVEMENT IN BUTTER-PACKAGES.

Specification forming part of Letters Patent No. 171,975, dated January 11, 1876; application filed December 17, 1875.

*To all whom it may concern:*

Be it known that I, A. JOHN BELL, of Ashland, in the county of Boyd and State of Kentucky, have invented certain Improvements in Butter-Firkins, of which the following is a full, clear, and exact description, reference being had to the accompanying drawing and the letters of reference marked thereon, making part of this specification, in which—

Figure 1 is a vertical sectional view on the line $y\,y$, Fig. 2. Fig. 2 is a cross-section on the line $x\,x$, Fig. 1. Fig. 3 is a plan view of the gasket or washer.

My present invention consists in putting up at the dairy fresh butter in such manner as to securely guard against its becoming rancid or having a sour scent.

It is well known to all who are chemically familiar with the different ingredients that compose butter that it contains palmitic acid and butyric acid, and that the characteristic odor and flavor of butter are due to the presence of a small quantity of peculiar fats—viz., butyrin, caproin, and caprylin. Each of the fats, when saponified, yields glycerine and a peculiar volatile acid named butyric acid, capronic acid, and caprylic acid. The moment these acids form, and through the action of the atmosphere become in the slightest degree oxidized, rancidity is sure to ensue. The only remedy for preventing the formation of these last-mentioned acids is to put up the butter at the dairy when perfectly fresh, closely packed, and secured in a perfectly air-tight tub or other vessel.

The nature of my invention consists in employing sets of tubs or other vessels, two constituting a set, and which are filled as hereinafter explained, one tub being upset on the other, and a tight joint being formed between the same by means of suitable gaskets or washers, and a cloth is placed between the washers a little greater in diameter than the tub, to permit of the tubs being readily separated, and in then securing the same in a suitable pressure-cage, which is used in forming the tight joint, and provides a most convenient means for its safe transportation, and secures the tubs or cups in such manner as to insure the butter from rancidity.

The construction and operation of my invention are as follows: A A' are two tubs or cups, and may be made of glass, earthenware, stoneware, or any other suitable material. They are usually of the same capacity, and must be of uniform diameter, so that when the tub or cup A' is upset on the tub A their mouths or annular rims $a\,a'$ shall meet and exactly fit. At the dairy these tubs are filled with pure fresh butter, which is closely packed, leaving a slight excess of butter in each tub or cup, and the excess may be paddled down, leaving, as it were, a slight convexed dome of butter in each vessel, so as to provide a full vessel after the air and water are pressed out. On the upper rim of the vessel A is placed a washer or gasket, B, as shown in each of the figures of the accompanying drawing. A cloth, C, is then placed over the tub, resting on the washer B. Another washer, B, is then placed over the cloth C and the vessel A' upset, its rim resting on the last washer named. The vessel is then placed on a base-board, D, and a similar board, D', placed over the base, or, in its upset condition, the top of the tub A'. These boards D D' are provided with small openings $d$, through which pass metallic rods E E, having heads at their base, and which terminate in screw-threads at their upper section, as shown in Fig. 1, and are fastened by nuts $e\,e$. These boards D D' and metallic rods E E and nuts $e\,e$ constitute an open cage, in which the butter can safely be transported, and a press to work out the air and all undue moisture, tightened to the desired degree simply by turning the nuts, and which forms a perfectly air-tight joint between the vessels by means of the washers B B.

It will be seen by reference to Fig. 1 that the boards D D' are of such dimensions as only to accommodate one tier of vessels, A A'; but they can be readily enlarged, so as to accommodate a half dozen or more. When you wish to remove the tier you simply have to loosen the nuts $e\,e$, take off the upper board, and the vessel A' can be removed, the cloth C preventing the butter of one vessel mixing with that of another. The cups or tubs can thus easily be sold together or separately, as may be deemed most desirable. Should there be more than one tier, the board D' should be replaced and fastened, as before, by means of the rods E E and nuts *e e*.

I am aware that air-tight vessels for packing butter have been used before; therefore I make no broad claim to such.

What I claim as new, and desire to secure by Letters Patent of the United States, is—

1. The cups or tubs A A', washers B B, and cloth C, the whole combined and arranged, in connection with a pressure-cage, to operate substantially as described.

2. In combination with the cups or tubs A A' and washers B B, the boards D D', rods E E, and nuts *e e*, the whole arranged to operate substantially as described.

In testimony whereof I have signed my name to this specification in the presence of two subscribing witnesses.

A. JOHN BELL.

Witnesses:
 JNO. F. HAGER,
 I. M. GIBBONS.